UNITED STATES PATENT OFFICE 2,636,892

PRODUCTION OF METAL OXALATES

Simon Ernest Mayer, London, England, assignor to International Standard Electric Corporation, New York, N. Y., a corporation of Delaware No Drawing. Application April 21, 1949, Serial No. 88,917. In Great Britain April 23, 1948

2 Claims. (Cl. 260—439)

This invention relates to a process for producing finely divided metals or metal oxides and for making solid bodies from metals or metal oxides so produced.

It has long been known that solid bodies may be made by pressing powders and then sintering the compressed powders, and that this offers considerable advantages when the bodies are to be made of metal alloys or of compounds of two or more metal oxides.

It is however, very important in many applications that the metal or oxide powders so used should be of a high degree of purity.

It is one object of the present invention to produce metal or metal oxide powders for such purposes free of undesired impurities.

It is another object of the invention to produce bodies from pressed and sintered metal or metal oxide powders, which bodies are of the highest possible density. This is especially important in the case of bodies of magnetic materials that are intended to be of high permeability.

In order to produce finely divided metal or metal oxides the invention provides a process for producing metal oxalates in a high degree of purity.

It is known to precipitate an oxalate or oxalates from a solution of the corresponding sulphate or sulphates and then to decompose the oxalate or oxalates to metal.

In the processes hitherto proposed, however, it has been difficult to ensure that the powders and the resulting bodies produced by pressing and sintering the powders are free from sulphur though it is known that the presence of sulphur is in general deleterious.

According to the present invention a process of making a finely divided metal or metal oxide comprises the step of precipitating the oxalate of the metal by means of oxalic acid from a solution of the sulphate at a temperature between 40° C. and 90° C. in the presence of a mild organic reducing agent and of sulphuric acid sufficient to bring the pH of the solution to a value not exceeding 3.

The mild organic reducing agent may be formaldehyde but is preferably a sugar such as glucose. This agent prevents the formation of such sulphates as ferric sulphate. The presence of sulphuric acid in the quantity stated ensures that no basic sulphates are precipitated.

The fact that precipitation takes place from a hot solution prevents the adsorption of sulphate ions by precipitated particles. Such sulphate ions when so adsorbed cannot be removed by subsequent washing. The upper limit of temperature viz. 90° C. is fixed in order to avoid the decomposition of the organic reducing agent used, and for this reason it is preferred to place the upper limit of temperature at 70° C. In order to ensure a sufficiently hot solution for the purpose stated above it is also preferred to place the lower limit of temperature at 60° C.

The precipitate is separated by filtration and is then washed, first in oxalic acid and then in distilled water, and is then dried by heating. After crushing to break up any lumps formed the powder is heated to decompose the oxalate or oxalates at a temperature between 400° C. and 800° C.

If metal powder is required the heating is carried out in an atmosphere of hydrogen (containing between ½% and 10% of water vapour). This reducing atmosphere prevents the formation of any oxide and yet removes carbon to very low limits. If powder oxide or oxides is required the heating is carried out in air or oxygen.

It is preferable to carry out either of these decompositions by heating in a continuous furnace, a stream of the required gas being passed in the opposite direction to the travel of the powdered material.

In making solid bodies from powders by pressing and sintering it is advantageous that a high density be obtained by the pressing step in order that shrinkage (or subsequently sintering) shall be reduced to the smallest possible. Shrinkage gives rise to distortion of the finished product. In order to ensure such a high density by pressing, not only must the pressure be high, but it is important that there should be a wide range of grain size and a low internal friction in the powder. On the other hand a small grain size is desirable for obtaining densities near to those of the solid metals with only short times of sintering and without too high temperatures for that step.

The process according to the invention leads to low apparent internal friction in the powder since the grains produced by the decomposition of oxalates are porous. The average grain size depends upon the temperature of decomposition being lower and becomes smaller as the temperature at which the decomposition is carried out is reduced. In order to obtain a good space factor it is therefore advisable to form solid bodies by pressing and sintering a mixture of powders formed by decomposition of the oxalates at different respective temperatures. In practice it is found that good results can be obtained by using a mixture of two batches of powder produced by decomposition at two different temperatures. The exact temperatures used and the proportions of the mixture depend upon the composition of the body to be formed.

As an example the manufacture of diaphragms for telephone receivers is given. Such diaphragms are usually manufactured from an alloy of approximately 50% cobalt and 50% iron, but as this alloy is very difficult to roll out into the desired thinness a small percentage of vanadium is usually added to facilitate the rolling operations. When, however, such diaphragms are made by pressing and sintering it is not necessary to add any third constituent for this purpose.

A mixture of cobalt and iron oxalates in approximately equal proportions by weight is precipitated as described above. After washing, drying and crushing one batch of the mixed oxalates is reduced to metal as described above at a temperature of 675° C. and another batch at 525° C. mixture is formed of 84% by weight of the metal produced by reduction at 675° C. and 16% by weight of the metal produced by reduction at 525° C. This mixture has a mean grain size of $9\mu$ and a range of grain sizes from $\frac{1}{2}\mu$ to $20\mu$. This mixture is compressed into the form of thin circular diaphragms under a pressure of 75 tons to the square inch. The thin discs so formed are then placed in stacks and sintered. The sintering temperature is not allowed to rise above 1150° C. and is preferably kept at 1050° C. It is found that at this last mentioned temperature the discs do not stick together at all.

Another example is the core of an inductance formed of a pressed and sintered magnetic spinel, i. e. a compound of zinc oxide, nickel oxide and ferric oxide. A compound of zinc oxide, nickel oxide and ferric oxide in the molecular proportions of 35%, 15% and 50% respectively is very suitable. For the preparation of such a core the mixed oxalates are reduced to oxides in two batches at 750° C. and 600° C. respectively and the pressed and sintered body formed from a mixture of 75% of the oxide produced at the higher temperature to 25% of the oxide produced at the lower temperature. In the formation of such a body mixed grain size is of especial importance because these magnetic compounds of metal oxides are so hard that comparatively little reduction of volume can be obtained by compression.

Another example of the use of the invention is the production of solid bodies of nickel iron alloys such as 78.5% Ni, 4% Mo, and the remainder iron. In this case the reduction temperatures are 750° C. and 600° C. and the body is made by pressing and sintering a mixture of 75% of metal powder produced by reduction at the higher temperature and 25% produced by reduction at the lower temperature, proportions being by weight.

The invention is not limited to the production of magnetic materials but is also useful for making those alloys of iron nickel and cobalt that are used in such arts as vacuum tube manufacture because of their suitability for sealing though glass. It is more advantageous to make these alloys by pressing and sintering powders than by usual methods, since the latter may give rise, particularly in bodies of some size, to orientation of the crystals in one direction, which may interfere with the adherence of glass to some surface of the body. Moreover the freedom from impurities given by the process according to the invention is of considerable importance for these glass sealing properties.

While the principles of the invention have been described above in connection with specific embodiments and particular modifications thereof, it is to be clearly understood that this description is made by way of example and not as a limitation on the scope of the invention.

What is claimed is:

1. Process of making a finely divided metal oxalate which comprises the step of precipitating the oxalate of the metal by means of oxalic acid at a temperature between 40° C. and 90° C. from a solution of the metal sulphate in the presence of a mild organic reducing agent and of sulphuric acid sufficient to bring the pH of the solution to a value not exceeding 3.

2. Process as claimed in claim 1 in which the temperature of precipitation is from 60° to 70° C.

SIMON ERNEST MAYER.

References Cited in the file of this patent

UNITED STATES PATENTS

| Number | Name | Date |
|--------|------|------|
| 723,159 | Jenkins | Mar. 17, 1903 |
| 1,637,281 | Schatz | July 26, 1927 |

FOREIGN PATENTS

| Number | Country | Date |
|--------|---------|------|
| 419,953 | Great Britain | Nov. 22, 1934 |

OTHER REFERENCES

"Powder Metallurgy," by Jones, published by Edward Arnold, London, 1937, page 178.

"Powder Metallurgy," by Wulff, published by the the American Society for Metals, 1942, page 391.